United States Patent
Williams et al.

(10) Patent No.: US 11,281,582 B2
(45) Date of Patent: Mar. 22, 2022

(54) COMPLETION LOGIC PERFORMING EARLY COMMITMENT OF A STORE-CONDITIONAL ACCESS BASED ON A FLAG

(71) Applicant: INTERNATIONAL BUSINESS MACHINES CORPORATION, Armonk, NY (US)

(72) Inventors: Derek E. Williams, Round Rock, TX (US); Guy L. Guthrie, Austin, TX (US); William J. Starke, Round Rock, TX (US); Hugh Shen, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 16/742,380

(22) Filed: Jan. 14, 2020

(65) Prior Publication Data
US 2021/0216457 A1    Jul. 15, 2021

(51) Int. Cl.
*G06F 12/0815* (2016.01)

(52) U.S. Cl.
CPC .... *G06F 12/0815* (2013.01); *G06F 2212/603* (2013.01)

(58) Field of Classification Search
CPC .......... G06F 12/0815; G06F 2212/603; G06F 12/084
USPC .......... 712/225, 216; 710/58; 711/144, 122; 718/102
See application file for complete search history.

(56) References Cited

U.S. PATENT DOCUMENTS

| | | | |
|---|---|---|---|
| 5,751,946 A | * | 5/1998 | Afsar .................... G06F 9/3834 712/E9.048 |
| 6,070,238 A | * | 5/2000 | Feiste ................. G06F 9/30043 712/217 |
| 6,185,658 B1 | | 2/2001 | Arimilli et al. |
| 6,247,098 B1 | | 6/2001 | Arimilli et al. |
| 6,334,172 B1 | | 12/2001 | Arimilli et al. |
| 6,757,767 B1 | * | 6/2004 | Kelleher ............... G06F 3/0613 710/107 |
| 7,197,604 B2 | | 3/2007 | Guthrie et al. |
| 7,254,678 B2 | | 8/2007 | Alexander et al. |
| 7,475,191 B2 | | 1/2009 | Guthrie et al. |
| 8,296,519 B2 | | 10/2012 | Guthrie et al. |
| 8,327,074 B2 | | 12/2012 | Guthrie et al. |
| 9,396,127 B2 | | 7/2016 | Guthrie et al. |

(Continued)

*Primary Examiner* — Hong C Kim
(74) *Attorney, Agent, or Firm* — Brian F. Russell; Jason Sosa

(57) ABSTRACT

A data processing system includes multiple processing units all having access to a shared memory system. A processing unit includes a lower level cache configured to serve as a point of systemwide coherency and a processor core coupled to the lower level cache. The processor core includes an upper level cache, an execution unit that executes a store-conditional instruction to generate a store-conditional request that specifies a store target address and store data, and a flag that, when set, indicates the store-conditional request can be completed early in the processor core. The processor core also includes completion logic configured to commit an update of the shared memory system with the store data specified by the store-conditional request based on whether the flag is set.

19 Claims, 11 Drawing Sheets

(56) References Cited

U.S. PATENT DOCUMENTS

| | | | |
|---|---|---|---|
| 2010/0131742 A1* | 5/2010 | Col | G06F 9/3885 |
| | | | 712/220 |
| 2011/0161590 A1* | 6/2011 | Guthrie | G06F 9/3834 |
| | | | 711/122 |
| 2012/0079246 A1 | 3/2012 | Breternitz, Jr. et al. | |
| 2012/0198167 A1* | 8/2012 | Guthrie | G06F 9/30087 |
| | | | 711/122 |
| 2015/0242320 A1* | 8/2015 | Guthrie | G06F 12/0811 |
| | | | 711/122 |
| 2015/0242327 A1* | 8/2015 | Guthrie | G06F 12/0891 |
| | | | 711/122 |
| 2017/0293559 A1* | 10/2017 | Guthrie | H04L 45/7457 |
| 2020/0089503 A1* | 3/2020 | Gupta | G06F 9/3804 |
| 2020/0356409 A1* | 11/2020 | Williams | G06F 12/0891 |
| 2021/0124508 A1* | 4/2021 | George | G06F 3/0604 |

\* cited by examiner

200 loop:
```
larx r1, var      ~202
add  r1, 1        ~204
stcx var, r1      ~206
beq  loop         ~208
```

FIG. 2A

210 loop:
```
load r1, lock     ~220  ⎫
cmp  r1, 1        ~222  ⎬ 212
beq  loop         ~224  ⎭ larx r1, lock     ~230  ⎫
cmp  r1, 1        ~232  ⎪
beq  loop         ~234  ⎬ 214
li   r2, 1        ~236  ⎪
stcx lock, r2     ~238  ⎪
beq  loop         ~239  ⎭ barrier           ~240  ⎫
...               ~242  ⎬ 216
(critical section        ⎪
 instructions)           ⎪
...                      ⎪
barrier           ~244  ⎭ li    r2, 0       ~250  ⎫
store lock, r2    ~252  ⎬ 218
```

FIG. 2B

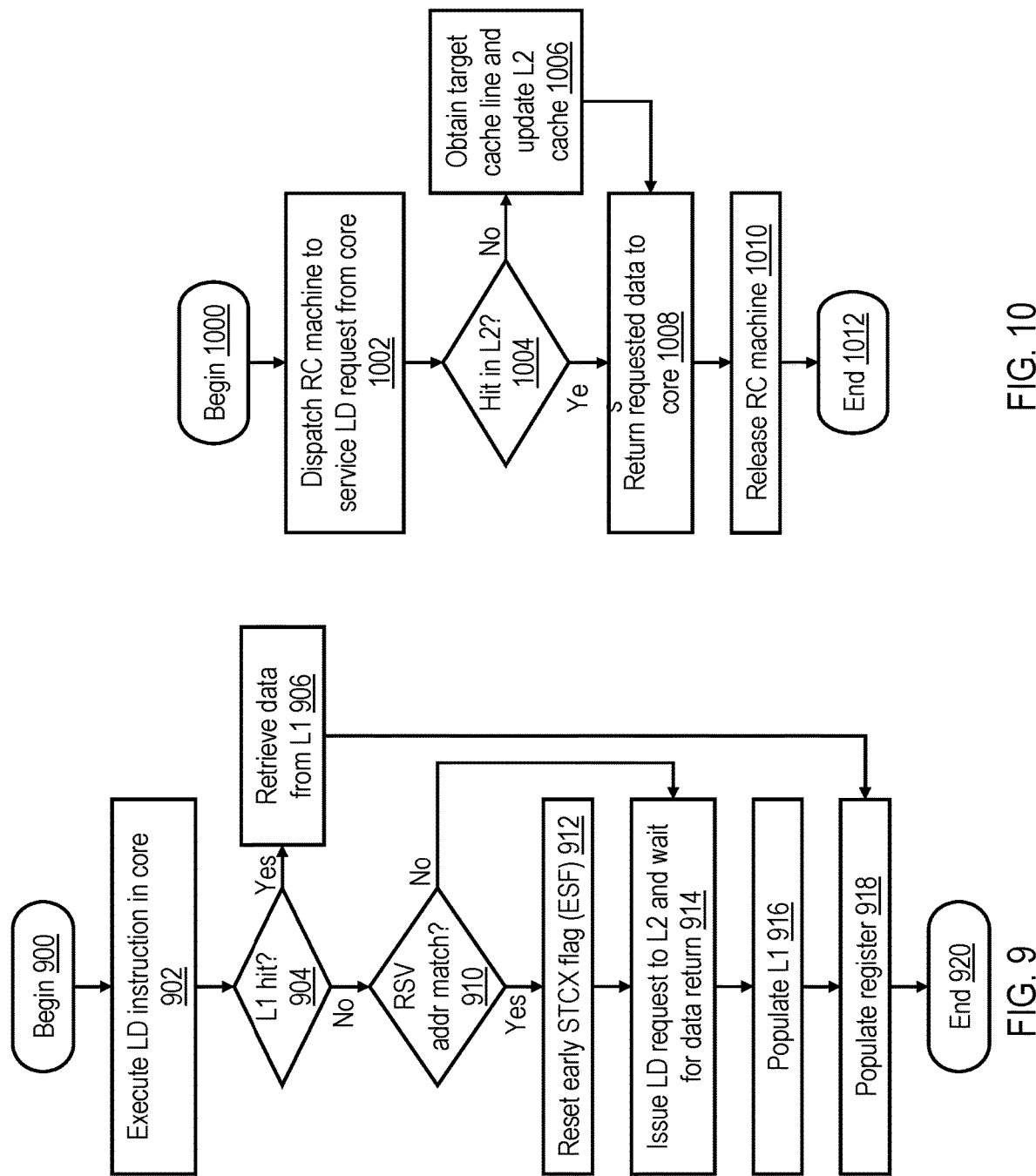

COMPLETION LOGIC PERFORMING EARLY COMMITMENT OF A STORE-CONDITIONAL ACCESS BASED ON A FLAG

BACKGROUND OF THE INVENTION

The present invention relates in general to data processing system and, in particular, to managing accesses to data in shared memory of a data processing system. Still more particularly, the present invention relates to a processor, data processing system and method for synchronizing accesses to data in a shared memory.

In shared memory multiprocessor (MP) data processing systems, each of the multiple processors in the system may access and modify data stored in the shared memory. In order to synchronize access to a particular granule (e.g., cache line) of memory between multiple processing units and threads of execution, load-reserve and store-conditional instruction pairs are often employed. For example, load-reserve and store-conditional instructions have been implemented in the POWER® instruction set architecture with request codes (opcodes) associated with various mnemonics, referred to herein generally as LARX and STCX. The goal of load-reserve and store-conditional instruction pairs is to load and modify data and then to commit the modified data to coherent memory only if no other thread of execution has modified the data in the interval between the load-reserve and store-conditional instructions. Thus, a read-modify-write operation targeting shared memory can be emulated without the use of an atomic update primitive that strictly enforces atomicity.

In at least some architectures, a determination of whether or not a given store-conditional instruction will succeed in updating memory is not made at the processor core that executes the store-conditional instruction. Instead, the determination is made at a lower level of a cache hierarchy (e.g., at the lower level cache at which write authority for the target cache line is also determined) and then communicated back to the processor core. The present disclosure appreciates that this arrangement forms a communication loop between the processor core and lower level cache that, due to the inherent communication latency, slows the processing of store-conditional instructions and all instructions dependent upon them.

BRIEF SUMMARY

In one or more embodiments, processing of a store-conditional instruction is accelerated by committing an update to a shared memory system indicated by the store-conditional instruction at the processor core that executes the store-conditional instruction prior to transmitting a corresponding store-conditional request to a point of system-wide coherence.

In at least one embodiment, a data processing system includes multiple processing units all having access to a shared memory system. A processing unit includes a lower level cache configured to serve as a point of systemwide coherency and a processor core coupled to the lower level cache. The processor core includes an upper level cache, an execution unit that executes a store-conditional instruction to generate a store-conditional request that specifies a store target address and store data, and a flag that, when set, indicates the store-conditional request may be completed early in the processor core. The processor core also includes completion logic configured to commit an update of the shared memory system with the store data specified by the store-conditional request based on whether the flag is set.

BRIEF DESCRIPTION OF THE SEVERAL VIEWS OF THE DRAWINGS

FIG. 2A depicts a first exemplary instruction sequence that employs load-reserve and store-conditional instructions to synchronize access to shared memory;

FIG. 2B illustrates a second exemplary instruction sequence that employs load-reserve and store-conditional instructions to coordinate execution of a critical section of a multithreaded program;

FIG. 9 is a high-level logical flowchart of an exemplary method of processing a load instruction in a processor core in accordance with one embodiment;

FIG. 10 is a high-level logical flowchart of an exemplary method of processing a load request in a lower level cache in accordance with one embodiment;

DETAILED DESCRIPTION

Figure 1:
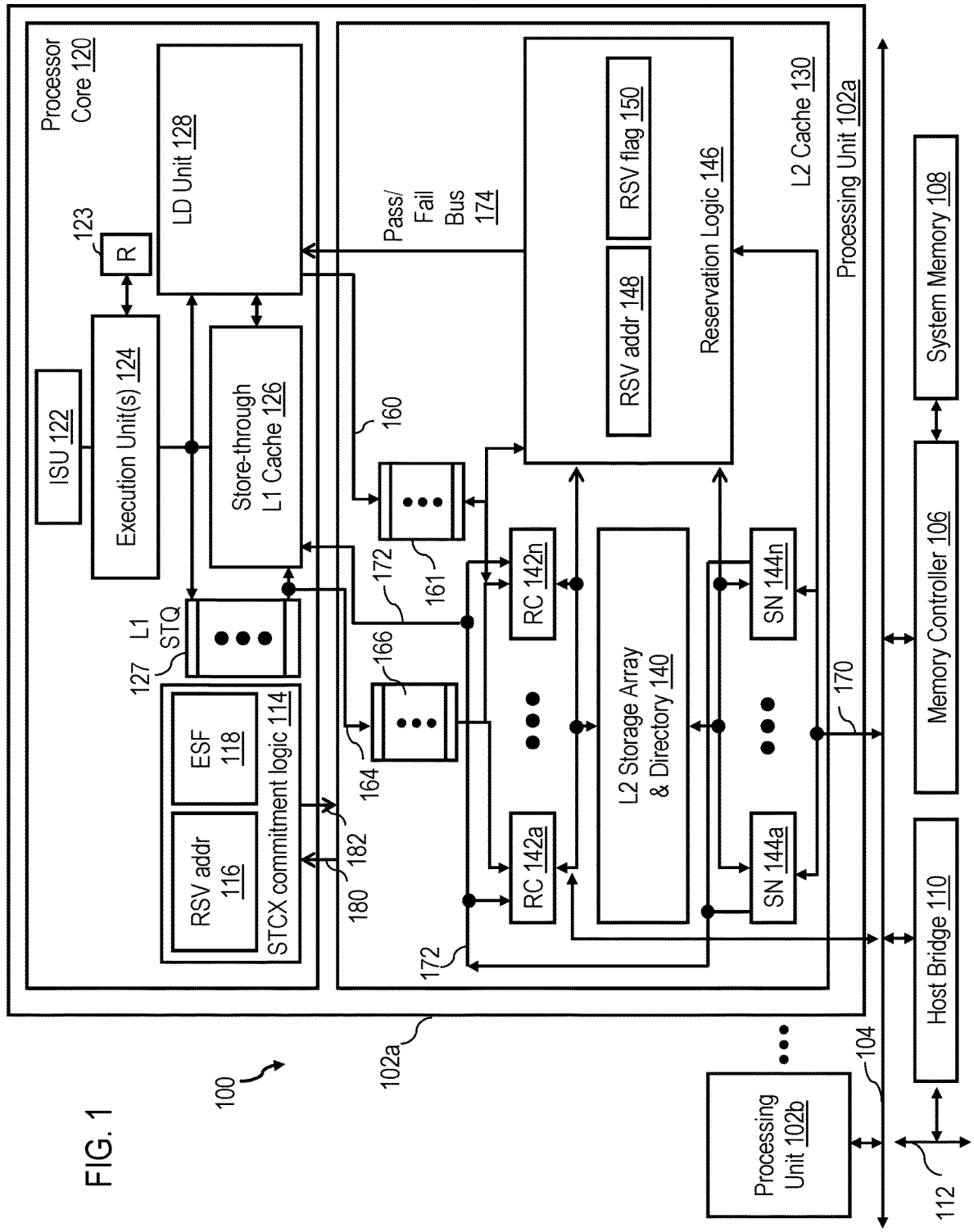
FIG. 1 is a high-level block diagram of an illustrative data processing system in accordance with one embodiment.

With reference now to the figures and in particular with reference to FIG. 1, there is illustrated a high-level block diagram of a data processing system 100 in accordance with one embodiment. As shown, data processing system 100 includes multiple processing units 102 (including at least processing units 102a-102b) for processing data and instructions. Processing units 102 are coupled for communication to a system interconnect 104 for conveying address, data and control information between attached devices. In the depicted embodiment, these attached devices include not only processing units 102, but also a memory controller 106 providing an interface to a shared system memory 108 and one or more host bridges 110, each providing an interface to a respective mezzanine bus 112. Mezzanine bus 112 in turn provides slots for the attachment of additional unillustrated devices, which may include network interface cards, I/O adapters, non-volatile memory, non-volatile storage device adapters, additional bus bridges, etc.

As further illustrated in FIG. 1, each processing unit 102, which may be realized as a single integrated circuit, includes one or more processor cores 120 (of which only one is explicitly shown) for processing instructions and data. Each processor core 120 includes an instruction sequencing unit (ISU) 122 for fetching and ordering instructions for execution, one or more execution units 124 for executing instructions dispatched from ISU 122, and a set of registers 123 for temporarily buffering data and control information. The instructions executed by execution units 124 include load-reserve and store-conditional instructions, which are utilized to synchronize access to shared memory between a particular thread of execution and other concurrent threads of execution. Although in some embodiments the execution units 124 of a processor core 120 may execute instructions in multiple simultaneous hardware threads of execution, it will hereafter be assumed for ease of explication that each processor core 120 executes a single hardware thread at a time. In a preferred embodiment, execution units 124 execute at least load-reserve and store-conditional instructions in-order (other instructions may or may not be executed out-of-order).

Each processor core 120 further includes an L1 store queue (STQ) 127 and a load unit 128 for managing the completion of store and load requests, respectively, corresponding to executed store-type and load-type instructions (including load-reserve and store-conditional instructions). In a preferred embodiment that will hereafter be assumed, L1 STQ 127 is implemented as a First-In, First-Out (FIFO) queue containing a plurality of queue entries. In this embodiment, store and barrier requests are loaded in the "top" entry of L1 STQ 127 at execution of the corresponding instructions, and are initiated when the requests reach the "bottom" or "commit" entry of L1 STQ 127.

It is important to note that the present application makes a distinction between "instructions", such as load-reserve and store-conditional instructions, and "requests." Load-type and store-type "instructions" (including load-reserve and store-conditional instructions) are defined herein as inputs to an execution unit that include an request code (opcode) identifying the type of instruction and one or more operands specifying data to be accessed and/or its address. Load-type and store-type "requests," including load-reserve and store-conditional requests, are defined herein as data and/or signals generated following instruction execution that specify at least the target address of data to be accessed. Thus, load-reserve and store-conditional requests may be transmitted from a processor core 120 to the shared memory system to initiate data accesses, while load-reserve and store-conditional instructions are not.

The operation of processor core 120 is supported by a multi-level volatile memory hierarchy having, at its lowest level, shared system memory 108, and at its upper levels two or more levels of cache memory, which in the illustrative embodiment include a level-one (L1) cache 126 and a level-two (L2) cache 130. As in other shared memory multiprocessor data processing systems, the contents of the memory hierarchy may generally be accessed and modified by the threads of execution executing in any of the processor cores 120 in any of the processing units 102 of data processing system 100.

In accordance with one embodiment, L1 cache 126, which may include bifurcated L1 data and instruction caches, is implemented as a store-through cache, meaning that the point of cache coherency with respect to other processor cores 120 is located below L1 cache 126 and, in the depicted embodiment, is located at store-in L2 cache 130. Accordingly, as described above, L1 cache 126 does not maintain true cache coherency states (e.g., Modified, Exclusive, Shared, Invalid or other similar coherence states) for its cache lines, but only maintains valid/invalid bits. Because L1 cache 126 is implemented as a store-through cache, store requests first complete relative to the associated processor core 120 in L1 cache 126 and then complete relative to other processing units 102 at a point of systemwide coherency, which in the depicted embodiment is L2 cache 130.

As further illustrated in FIG. 1, L2 cache 130 contains a storage array and directory 140 that store cache lines of instructions and data in association with their respective memory addresses and coherence states. L2 cache 130 also includes a number of read-claim (RC) state machines 142a-142n for independently and concurrently servicing memory access requests received from the associated processor core 120. RC machines 142 receive core load-type requests from LD unit 128 in processor core 120 via load bus 160, an in-order L2 load queue (LDQ) 161, and command bus 162. Similarly, RC machines 142 receive core store-type requests from L1 STQ 127 in processor core 120 via store bus 164, an in-order L2 store queue (STQ) 166, and command bus 162.

L2 cache 130 further includes a number of snoop (SN) state machines 144a-144n for servicing memory access and other requests received from other processing units 102 via system interconnect 104 and snoop bus 170. SN machines 144 and RC machines 142 are each connected to a back-invalidation bus 172 by which any SN machine 144 or RC machine 142 can signal the invalidation of a cache line to processor core 120.

It is important to note that in a preferred embodiment L2 cache 130 is constructed such that typically at most a single one of RC machines 142 and SN machines 144 can be active servicing a request targeting a given target cache line address at any one time. Consequently, if a second request is received while a first request targeting the same cache line is already being serviced by an active RC machine 142 or SN machine 144, the later-in-time second request must be queued or rejected until servicing of the first request is completed and the active state machine returns to an idle state.

Processing unit 102 finally includes logic to support processing of load-reserve (LARX) and store-conditional (STCX) instructions. This logic includes STCX commitment logic 114 in processor core 120 and reservation logic 146 in L2 cache 130. As shown, STCX commitment logic 114 includes a reservation (RSV) address register 116 for storing an address for which a reservation was established by local execution of a LARX instruction, as well as an early STCX flag (ESF) 118 indicating whether or not a local STCX targeting the reservation address can possibly be committed early (i.e., without subsequent communication with L2 cache 130) in processor core 120. Reservation logic 146 in L2 cache 130 includes a RSV address register 148 for recording a reservation address of the associated processor core 120 and an associated RSV flag 150. When set (e.g., to '1'), RSV flag 150 indicates that a reservation is valid for the address contained in RSV address register 148 and otherwise indicates no reservation is held. Reservation logic 146 supplies pass and fail indications indicating the success or failure of STCX requests completed in L2 cache 130 to processor cores 120 via pass/fail bus 174.

Those skilled in the art will additionally appreciate that data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache coherent data processing systems of diverse architectures and are in no way limited to the generalized data processing system architecture illustrated in FIG. 1.

Multiprocessor data processing systems such as data processing system 100 of FIG. 1 implement a memory consistency model that specifies the legal possible executions of a given multiprocessor program with respect to memory accesses (e.g., among other things, the values that may be returned by load instructions, the order of writes to memory, those instruction execution dependencies that affect the ordering of memory accesses, and the final values for memory locations at the conclusion of a multiprocessor program). A memory consistency model is specified by two major characteristics: ordering of memory access requests and atomicity of store requests.

The ordering of memory requests specifies how memory requests may, if at all, be re-ordered relative to the order of their respective load and store instructions in the individual threads of execution in the multiprocessor program. Memory consistency models must define ordering of memory access requests in four general cases: (1) ordering of the memory requests for a load instruction to a following load instruction, (2) ordering of the memory requests for a load instruction to a following store instruction, (3) ordering of the memory requests for a store instruction to a following store instruction, and (4) ordering of the memory requests for a store instruction to a following load instruction. Strong consistency memory models will, in general, preserve all or at least most of these orderings. In particular, many strong consistency memory models enforce the first three orderings, but do not enforce store-to-load ordering. Weak consistency memory models will generally not enforce most or all of these orderings.

Atomicity of store requests refers to whether or not a given thread of execution can read the value of its own store request before other threads, and furthermore, whether the value written to the distributed shared memory system by the store request becomes visible to other threads in a logically instantaneous fashion or whether the value can become visible to other threads at different points in time. A memory consistency model is called "multi-copy atomic" if the value written by a store request of one thread becomes visible to all other threads in a logically instantaneous fashion. In general, strong consistency memory models are multi-copy atomic, and weak consistency memory models do not enforce multi-copy atomicity.

In a given multiprocessor program, program semantics often require that multi-copy atomicity and/or the various orderings between memory access requests are respected. Therefore, in an exemplary embodiment of data processing system 100, in which the distributed shared memory system implements a weak consistency memory model, so called "barrier" (e.g., SYNC) instructions are typically provided to allow the programmer to specify what memory access request orderings and atomicity are to be applied during execution of the multiprocessor program. In particular, a barrier instruction causes the distributed shared memory system to perform any memory accesses initiated by instructions preceding the barrier instruction prior to any memory accesses initiated by instructions following the barrier instruction.

Referring now to FIG. 2A, there is depicted a first exemplary instruction sequence 200 that employs load-reserve and store-conditional instructions to synchronize access to shared memory. In particular, instruction sequence 200 is utilized to update the value of a variable in shared memory.

Instruction sequence 200 begins with a LARX instruction 202 that loads the value of the variable (i.e., var) from shared memory into a private register r1 (i.e., one of registers 123) in the processor core 120 executing the instruction. The value of the variable is then updated locally in register r1, in this case, by an ADD instruction 204 incrementing the value of the variable by 1. The new value of the variable is then conditionally stored back into shared memory by STCX instruction 206. The success or failure of STCX instruction 206 in updating the value of the variable in shared memory is reflected in a condition code register (e.g., one of registers 123) in the processor core 120. Conditional branch instruction 208 then tests the condition code found in the condition code register and conditionally redirects execution based on the success or failure of STCX instruction 206. If the relevant bit(s) of the condition code register is/are equal to zero, indicating that the conditional update to the variable indicated by STCX instruction 206 failed (e.g., due to an intervening storage-modifying access to the variable by another thread between execution of LARX instruction 202 and STCX instruction 208), instruction sequence 200 will be repeated, and execution branches from conditional branch instruction 208 back to LARX instruction 202. If, however, the conditional update indicated by STCX instruction 206 succeeds, the condition code will be non-zero, and processing will continue with the next sequential instruction following instruction sequence 200.

With reference now to FIG. 2B, there is illustrated a second exemplary instruction sequence 210 that employs load-reserve and store-conditional instructions to coordinate execution of a critical section of a multithreaded program. As indicated, instruction sequence 210 includes, in program order, a polling instruction sequence 212, lock acquisition sequence 214, critical section 216, and lock release sequence 218.

As is known in the art, critical section 216 is, by definition, a portion of a program that includes accesses to a shared resource (e.g., a shared in-memory data set) that must not be concurrently accessed by more than one thread of the multiprocessor program. In order to keep the various hardware threads from making concurrent accesses to the shared resource, the multithreaded program bounds critical section 206 with barrier instructions 240, 244 that order execution of instructions within critical section 216 with respect to instructions in the same thread that are outside critical section 216. In addition, the multiprocessor program ensures that not more than one thread at a time enters into a critical section by implementing a lock to which access is synchronized by load-reserve and store-conditional instructions.

In particular, a thread attempts to acquire the lock needed to enter critical section 216 through execution of lock acquisition sequence 214. Lock acquisition sequence 214 begins with a LARX instruction 230 that loads the value of the lock variable (i.e., lock) from shared memory into a private register r1 (e.g., one of registers 123) in the executing processor core 120. The value of the lock variable is then tested by compare instruction 232 to determine whether or not the lock is currently in a locked state (i.e., the lock is held by another thread). If so, conditional branch instruction 234 causes execution to return to the beginning of polling instruction sequence 212 (which is described in greater detail below). In response to a determination that the lock is not currently held by another thread, a LOAD immediate instruction 236 places a value of '1' (representing a locked state) into a register r2 (e.g., another one of registers 123). A STCX instruction 238 then conditionally updates the lock variable in shared memory to the locked state, thus securing the lock for the executing thread. As before, the success or failure of the STCX instruction in updating the value of the lock variable in shared memory is reflected in a condition code register in the processor core 120. Conditional branch instruction 239 tests the condition code found in the condition code register and conditionally redirects execution based on the success or failure of STCX instruction 238. If the relevant bit(s) of the condition code register is/are equal to zero, indicating that the conditional update to the lock variable indicated by STCX instruction 238 failed (e.g., due to an intervening storage-modifying access to the lock variable by another thread between execution of LARX instruction 230 and STCX instruction 238), instruction sequence 210 will be repeated from the beginning of instruction polling sequence 212. If, however, the conditional update to the lock variable indicated by STCX instruction 238 succeeds, the condition code will be non-zero, and processing will proceed sequentially to critical section 216. Once critical section 216 completes, the thread will release the lock by updating the lock variable in shared memory by executing a lock release sequence 218 including a LOAD immediate instruction 250 that loads register r2 with a value of '0' (representing an unlocked state) and a STORE instruction 252 that updates the lock variable in shared memory with this value. Thereafter, execution of the thread proceeds to subsequent instructions, if any.

Although a multiprocessor program could be implemented with only lock acquisition sequence 214, critical section 216, and lock release sequence 218 (i.e., omitting polling instruction sequence 212), in practice such a multiprocessor program would not efficiently utilize the resources of a processing unit, such as a processing unit 102 in FIG. 1. In particular, LARX instruction 230, which is utilized to load the lock value and set the reservation for the lock address upon which the execution of STCX instruction 238 depends, is generally a resource-intensive instruction. Irrespective of the chosen implementation of the cache hierarchy, a LARX instruction requires communication with the systemwide coherence point in the cache hierarchy, and in implementations in which that the systemwide coherence point is not in the L1 cache, this communication results in the LARX instruction being more resource-intensive than a corresponding LOAD instruction. For example, in the current embodiment, regardless of whether the target address of LARX instruction 230 hits or misses in L1 cache 126, execution of LARX instruction 230 requires allocation of an entry in L2 LDQ 161, dispatch of an RC machine 142 in L2 cache 130, and update of reservation logic 146. Consequently, it is desirable that the thread iterate on a load target address using a less resource-intensive LOAD instruction rather than a more resource-intensive a LARX instruction.

Therefore, it is common for lock acquisition sequence 214 to be proceeded by a polling instruction sequence 212. Polling instruction sequence 212, which is constructed very similarly to the beginning of lock acquisition sequence 214, includes a polling LOAD instruction 220 (rather than a LARX instruction) that loads the lock value from shared memory, a compare instruction 222 that compares the lock value to a value of '1' (indicating a locked state), and a conditional branch instruction 224 that returns execution back to polling LOAD instruction 220 until the lock is found to be in the unlocked state. It is advantageous to employ polling LOAD instruction 220 to poll on the lock variable rather than a LARX instruction since a hit on the target address of polling LOAD instruction 220 in L1 cache 126 will not require utilization of any of the limited resources of L2 cache 130 (e.g., L2 LDQ 161, RC machines 142, and reservation logic 146).

In multithreaded programs that include instruction sequences such as instruction sequences 200 and 210, it is common for a hardware thread to execute multiple STCX instructions targeting the same store target address. For example, in the multithreaded program including instruction sequence 210, a hardware thread may need to acquire the same lock multiple times in order to execute various different critical sections of code. Because the target cache lines identified by STCX requests are commonly highly contended, it is not uncommon for these cache lines to bounce back and forth between the caches of various processing units 102, leading to significant traffic on the system interconnect 104 and execution inefficiency due to the conditional updates to shared memory indicated by the STCX requests being attempted multiple times prior to succeeding. In accordance with the described inventions, synchronized access to shared memory is improved by decreasing the latency of certain STCX requests by permitting these STCX requests to commit in the processor core 120 rather than at the point of systemwide coherency (e.g., in L2 cache 130).

Figure 3:
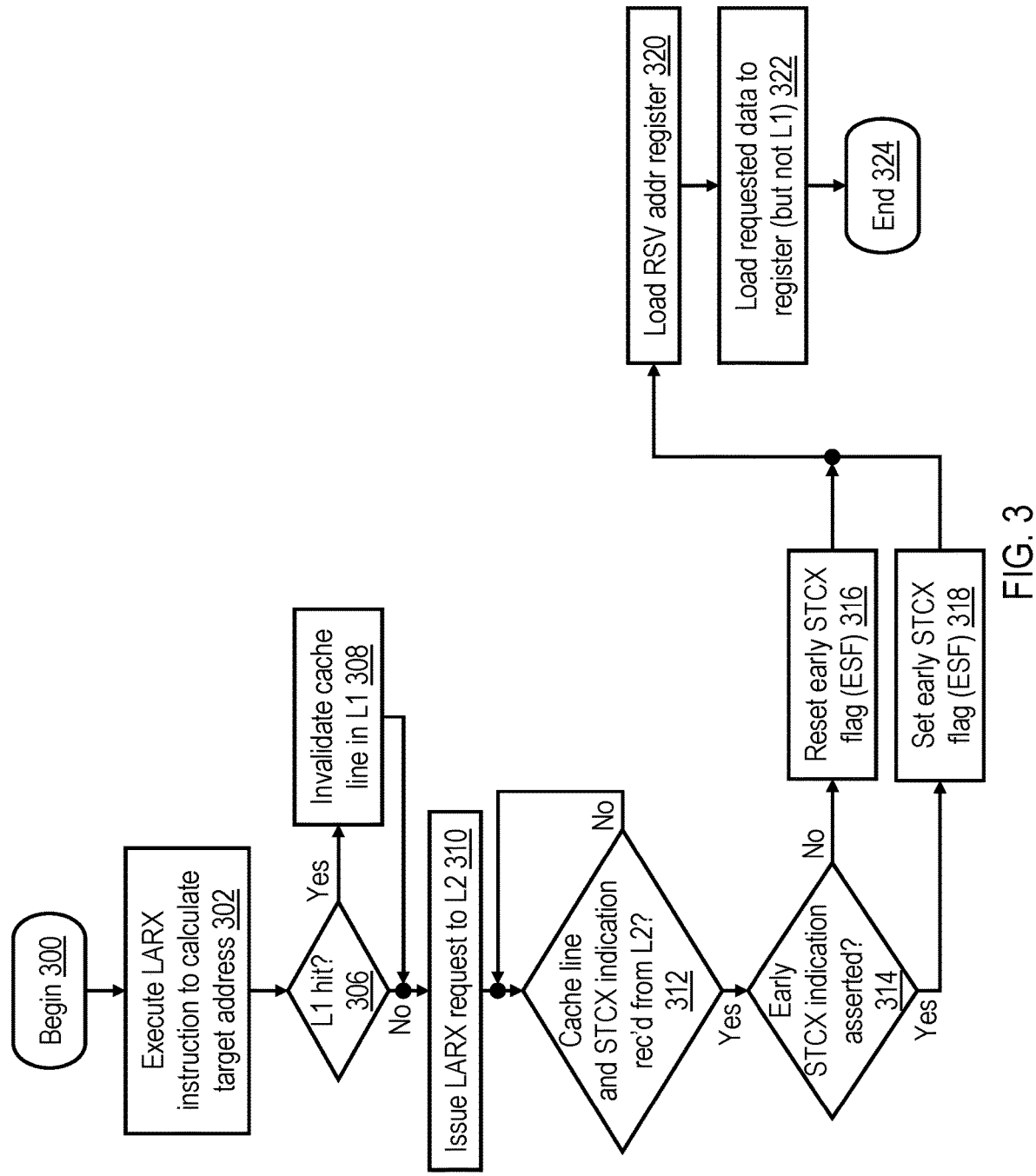
FIG. 3 is a high-level logical flowchart of an exemplary method of processing a load-reserve instruction in a processor core in accordance with one embodiment.

With reference now to FIG. 3, there is depicted a high-level logical flowchart of an exemplary method by which a processor core 120 of data processing system 100 processes a load-reserve (LARX) instruction in accordance with one embodiment. As shown, the process begins at block 300 and thereafter proceeds to block 302, which illustrates execution units 124 receiving a LARX instruction from ISU 122 and then executing the LARX instruction to calculate the load target address. In a preferred embodiment, execution units 124 execute LARX instructions within a hardware thread in-order and without pipelining, meaning that the data words(s) requested by a LARX instruction must be loaded to one or more registers 123 in processor core 120 before the next LARX or STCX instruction begins execution. These restrictions simplify the processing performed by STCX commitment logic 114 and reservation logic 146.

Following execution of the LARX instruction, an indication of the instruction type and the load target address calculated by execution of the LARX instruction are received from execution units 124 by LD unit 128. At block 306, LD unit 128 determines whether or not a cache line corresponding to the load target address of the LARX instruction resides in L1 cache 126. If so, LD unit 128 invalidates the cache line containing the load target address in L1 cache 126 (block 308). Those skilled in the art should appreciate that the invalidation of the cache line containing the load target address in L1 cache 126 is a simplifying design choice and that in other embodiments the cache line containing the load target address need not be invalidated in L1 cache 126. Following block 308 or in response to determining that the load target address of the LARX instruction missed in L1 cache 126, LD unit 128 issues a LARX request to L2 cache 130 via load bus 160 (block 310). The LARX request includes, for example, an indication of the request type and the load target address. After buffering the LARX request in L2 LDQ 161, L2 cache 130 dispatches the LARX request to an RC machine 142 for servicing, as described further below with reference to FIG. 4.

Next, at block 312, LD unit 128 awaits return, from L2 cache 130, of the requested cache line identified by the load target address and an early STCX indication. The early STCX indication is set by L2 cache 130 in block 416 or 418 of FIG. 4, as discussed further below. In some embodiments, the early STCX indication can be appended to the requested cache line. In response to receipt of the requested cache line and the early STCX indication, LD unit 128 determines at block 314 whether or not the early STCX indication received in conjunction with the requested cache line is asserted (e.g., set to "1"). If not, meaning that a STCX request corresponding to the LARX request cannot be committed early in processor core 120, LD unit 128 resets early STCX flag (ESF) 118 (block 316). Otherwise, if the early STCX indication received from L2 cache 130 is set, LD unit 128 sets early STCX flag 118 to indicate that a STCX request corresponding to the LARX request may possibly be committed early in processor core 120 (assuming, among other things, that ESF 118 is not reset in the interim) (block 318). Following either block 316 or block 318, LD unit 128 places the load target address of the LARX instruction in RSV address register 116 (block 320) and transfers the data word(s) associated with the load target address into a core register 123, but does not cache the requested cache line in L1 cache 126 (block 322). It should be appreciated that in an alternative embodiment that does not invalidate the requested cache line at block 308, the requested cache line can instead be cached in L1 cache 126 to permit subsequent load-type requests (including subsequent load-reserve requests), to hit in L1 cache 126. Following block 322, the process of FIG. 3 terminates at block 324.

Figure 4:
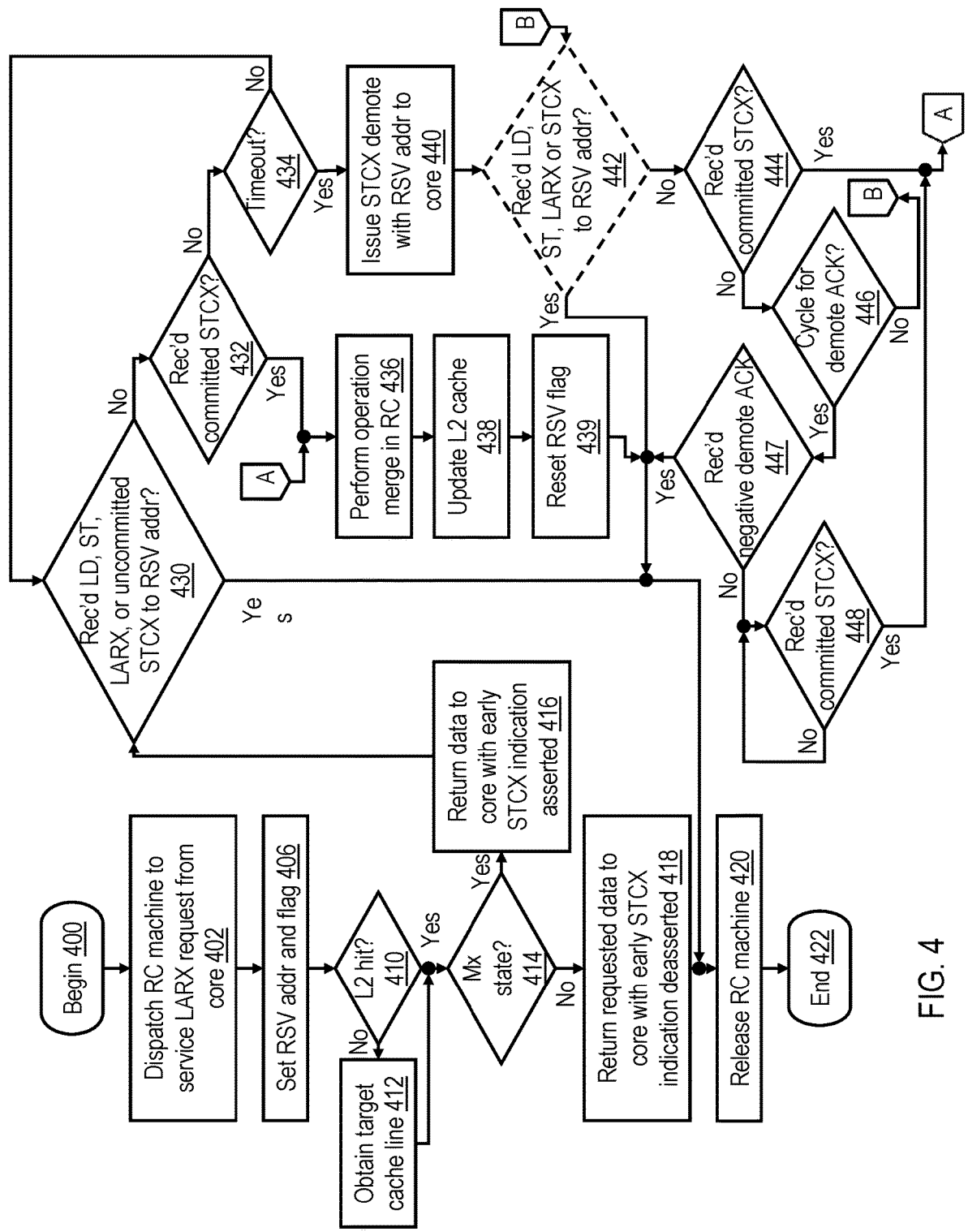
FIG. 4 is a high-level logical flowchart of an exemplary method of processing a load-reserve request in a lower level cache in accordance with one embodiment.

Referring now to FIG. 4, there is depicted a high-level logical flowchart of an exemplary method by which an L2 cache 130 of data processing system 100 processes a load-reserve (LARX) request in accordance with one embodiment. The process begins at block 400 and then proceeds to block 402, which depicts L2 cache 126 dispatching an RC machine 142 to service a next LARX request of the associated processor core 120 that is enqueued in L2 LDQ 161. As illustrated at block 406, RC machine 142 establishes a reservation for the load target address in L2 cache 130 in reservation logic 146 by placing the load target address in reservation address register 148 and setting the associated reservation flag 150.

At block 410, RC machine 142 additionally determines whether or not the load target address of the LARX request hit in L2 storage array and directory 140. If so, the process passes directly to block 414. If not, RC machine 142 issues one or more requests on system interconnect 104 in order to obtain a copy of the requested cache line from another cache hierarchy or system memory 108 (block 412). Depending on implementation, the request(s) issued at block 412 may simply request a query-only copy of the cache line and accept a copy with higher coherence authority (e.g., write authority), if available. Following block 412, the process proceeds to block 414, which depicts RC machine 142 determining whether the requested cache line is held in a coherence state (e.g., referred to herein as a modified (Mx) coherence state) that indicates the L2 cache 130 is the only L2 cache systemwide that holds a valid copy of the cache line and that confers the ability to update the requested cache line without notifying any other coherence participant. In response to a determination that the cache line is held or has been obtained in an Mx coherence state, the process passes to block 416 and following blocks, which are described below. If, however, RC machine 142 determines at block 414 that the cache line is held or has been obtained in a non-exclusive coherence state (e.g., a shared coherence state), the process passes to block 418, which depicts RC machine 142 returning the requested cache line to the associated processor core 120 with the early STCX indication deasserted. The deasserted early STCX indication indicates that a subsequent STCX request directed to the reservation address established by the LARX request cannot be committed early in the processor core 120 and must instead await a pass/fail determination by reservation logic 146 of L2 cache 130. Following block 418, the RC machine 142 servicing the LARX request transitions from the busy state to the idle state (block 420), and the process of FIG. 4 ends at block 422.

Referring now to block 416, RC machine 142 returns the requested cache line to the associated processor core 120 with the early STCX indication asserted. The asserted early STCX indication indicates that a subsequent STCX request directed to the reservation address established by the LARX request may, if possible, be committed early in the processor core 120 rather than awaiting a pass/fail determination by reservation logic 146 of L2 cache 130. The RC machine 142 then initiates a processing loop including blocks 430, 432, and 434 in which RC machine 142 extends its tenure in the busy state to facilitate, if possible, early completion of a STCX request for the reservation address. RC machine 142 exits this processing loop on detecting the first to occur of the events monitored in blocks 430, 432, and 434.

Block 430 illustrates RC machine 142 monitoring for any load (LD), store (ST), LARX, or uncommitted STCX request of the associated processor core 120 to the reservation address. Because of the ordering effects of address dependencies on memory access requests and because processor core 120 is preferably configured to reset early STCX flag 118 upon sending to L2 cache 130 a load, store, LARX, or uncommitted STCX request to the reservation address specified in RSV address register 116, if any of these types of conflicting requests is detected by RC machine 142 at block 430, then it is guaranteed that no committed STCX request matching the reservation address will be received by L2 cache 130 from processor core 120. Consequently, the RC machine 142 that has remained active following servicing of the LARX request in order to service a committed STCX request can return to an idle state. Accordingly, the process of FIG. 4 passes to block 420, which has been described. It should be noted that in this case, the conflicting LD, ST, LARX, or uncommitted STCX request detected at block 430 is preferably not rejected or queued by L2 cache 130, but is instead serviced by a different RC machine 142 than the one initially dispatched to service the LARX request at block 402, if available. Although not shown in FIG. 4, it would also be possible in an aggressive implementation for the RC machine 142 dispatched at block 402 to terminate its processing and then be immediately dispatched to handle the new incoming request.

Referring now to block 432, RC machine 142 additionally monitors for receipt of any committed STCX request from the associated processor core 120, meaning that the STCX request specifies the reservation address and has already been committed to the shared memory system by processor core 120. If a committed STCX request is detected at block 432, the process of FIG. 4 proceeds to blocks 436-438, which illustrates RC machine 142 merging the committed STCX request into its processing of the reservation address (block 436) and then performing the cache line update indicated by the committed STCX request in L2 storage array and directory 140 (block 438). RC machine 142 additionally resets RSV flag 148 (block 439), Thus, in this case, processing of the committed STCX request is expedited by early commitment of the committed STCX request in processor core 120 and by eliminating any requirement for a pass/fail determination to be made by reservation logic 146 and communicated back to processor core 120. Following block 439, the process of FIG. 4 passes to block 420, which has been described.

Referring to block 434, RC machine 142 additionally monitors for a timeout event indicating that RC machine 142 has waited for a committed STCX request from the associated processor core 120 for a maximum allowable period of time. If no timeout event is detected at block 434, the process of FIG. 4 returns to block 430, which has been described. If, however, RC machine 142 detects a timeout event at block 434, the process of FIG. 4 passes to block 440. Block 440 illustrates RC machine 142 issuing to the associated processor core 120 a STCX demote signal via signal line 180. The STCX demote signal informs processor core 120 that the time window in which a committed STCX request for the reservation address can be issued by processor core 120 has ended.

Those skilled in the art will appreciate that a STCX demote signal is not received instantaneously by processor core 120 and that, in the interval between issuance of the STCX demote signal by RC machine 142 and receipt of the STCX demote signal by processor core 120, processor core 120 may issue a committed STCX to L2 cache 130 from L1 STQ 127. Accordingly, following block 440, RC machine 142 enters a second processing loop including blocks 442, 444, and 446 in which RC machine 142 resolves this potential race condition. Block 442, which is optional, illustrates RC machine 142 monitoring for any of a load (LD), store (ST), or LARX, or un committed STCX request of the associated processor core 120 to the reservation address. If any of these types of requests is detected by RC machine 142 at block 442, no committed STCX for the reservation address can be received, and the process of FIG. 4 passes to block 420, which has been described. As further depicted at block 444, RC machine 142 also monitors for receipt of any committed STCX request from the associated processor core 120. If a committed STCX request is detected at block 444, the process of FIG. 4 proceeds through page connector A to block 436 and following blocks, which have been described. As shown at block 446, RC machine 142 also monitors for receipt, on a fixed schedule relative to STCX demote signal, of a demote acknowledgement (ACK) signal from the associated processor core 120 on signal line 182. The demote ACK signal acknowledges receipt by processor core 120 of the earlier STCX demote signal. If a determination is made at block 446 that it is not the cycle at which the demote ACK signal is scheduled to be received, then the process returns through page connector B to block 442, which has been described. If, however, RC machine 142 determines at block 446 it is the cycle for the demote ACK signal, the process exits the processing loop and proceeds to block 447.

At block 447, RC machine 142 determines whether the demote ACK signal is a positive or negative acknowledgement indicating whether a committed STCX request is present in L2 STQ 166. In response to a determination that the demote ACK signal is a negative acknowledgement, meaning that no committed STCX request is present in L2 STQ 166, the process simply passes to block 420, which has been described. If, however, the demote ACK signal is a positive acknowledgement indicating a committed STCX request is present in L2 STQ 166, the process proceeds to block 448, which illustrates RC machine 142 awaiting receipt of the committed STCX request. Once this committed STCX request is received, the process of FIG. 4 proceeds from block 448 through page connector A to block 436 and following blocks, which have been described.

Figure 5:
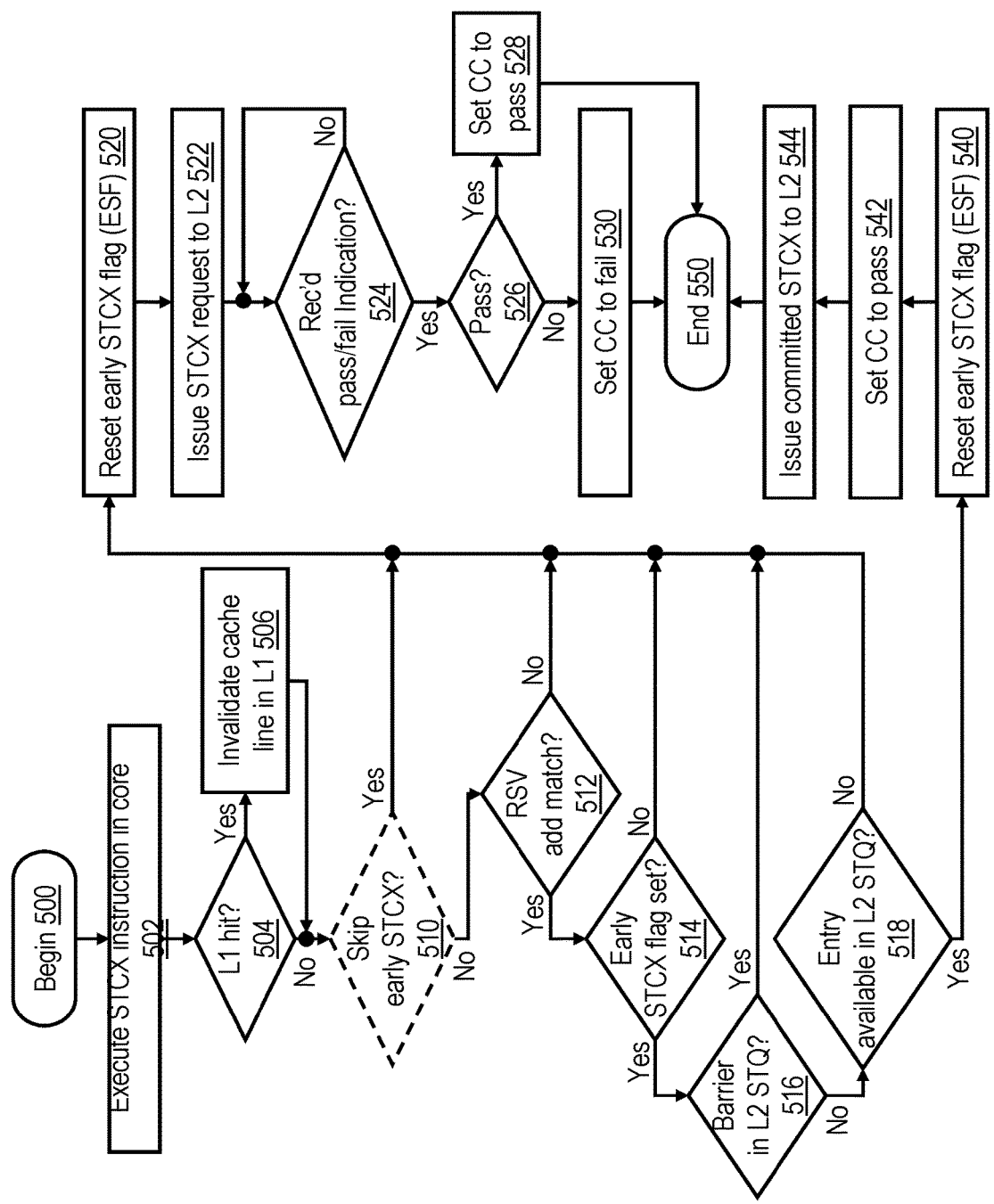
FIG. 5 is a high-level logical flowchart of an exemplary method of processing a store-conditional instruction in a processor core in accordance with one embodiment.

With reference now to FIG. 5, there is illustrated a high-level logical flowchart of an exemplary method of processing a store-conditional (STCX) instruction in a processor core in accordance with one embodiment. As depicted, the process begins at block 500 and thereafter proceeds to block 502, which illustrates execution units 124 receiving a STCX instruction from ISU 122 and then executing the STCX instruction to calculate a store target address. As with the LARX execution described above, execution units 124 also preferably execute STCX instructions appearing in the same hardware thread in-order and without pipelining with respect to both LARX and STCX instructions.

Upon execution of the STCX instruction, execution units 124 place a corresponding STCX request including the store target address calculated by execution of the STCX instruction and the store data specified by the operands of the STCX instruction within L1 STQ 127. When the STCX request corresponding to the executed STCX instruction reaches the bottom or commit entry of L1 STQ 127, L1 STQ 127 determines at block 504 whether or not the store target address of the STCX request hits in L1 cache 126. If so, L1 STQ 127 invalidates the target cache line held in L1 cache 126 (block 506).

Additionally, as indicated at blocks 510-518, STCX commitment logic 114 determines whether or not to commit the STCX request early in processor core 120. For example, at block 510, STCX commitment logic 114 may optionally determine whether or not a configuration setting is set to indicate that STCX requests are not to be committed early in processor core 120. If so, the process passes to block 520, which is discussed below. In response to a negative determination at block 510 or if block 510 is omitted, STCX commitment logic 114 determines at blocks 512, 514, 516, and 518, whether all the conditions to commit this particular STCX request early in processor core 120 are met, namely, that the STCX request specifies the reservation address stored in reservation address register 116 (block 512), early STCX flag 118 is set to indicate that early commitment of the STCX is supported by an active RC machine 142 busy on the target cache line in the writeable coherence state as discussed above with respect to blocks 430-434 and blocks 440-446 of FIG. 4 (block 514), no barrier request that might delay the STCX request is present in L2 STQ 166 (block 516), and an entry for buffering the STCX request is available L2 STQ 166 (block 518). It should be noted that in some embodiments, L2 STQ 166 can be configured to always reserve an available entry for buffering committed STCX requests in which case the test illustrated in block 518 is unnecessary. Similarly, in other implementations in which barrier requests reset ESF 118, block 516 can be omitted. If all of the conditions illustrated at blocks 512-518 are met, the STCX request can be committed early in processor core 120, and the process of FIG. 5 passes to block 540 and following blocks, which are described below. If, however, at least one of the conditions illustrated at block 512-518 is not met, the STCX request is not committed early, and the process of FIG. 5 proceeds to block 520 and following blocks.

At block 520, STCX commitment logic 114 resets early STCX flag 118. In addition, L1 STQ 127 issues an uncommitted STCX request to L2 STQ 166 of L2 cache 130 via store bus 164 (block 522). L1 STQ 127 then awaits return via pass/fail bus 174 of a pass or fail indication for the uncommitted STCX request indicating whether or not the uncommitted STCX request succeeded in updating L2 cache 130 (block 524). In response to receipt of the pass or fail indication via pass/fail bus 174, processor core 120 provides the pass or fail indication to execution units 124 (e.g., to indicate whether the path of execution should change) and, as shown at blocks 526-530, updates a condition code register among registers 123 to indicate whether the uncommitted STCX request passed or failed. Thereafter, the uncommitted STCX request is deallocated from L1 STQ 127, and the process of FIG. 5 terminates at block 550.

With reference now to block 540, in the case that early commitment of the STCX request is permitted, STCX commitment logic 114 resets early STCX flag 118. In addition, as shown at block 542, processor core 120 updates a condition code register among registers 123 to indicate the STCX request passed, thus permitting execution units 124 to immediately proceed with execution of instructions dependent upon the success of the STCX request without waiting (as at block 524) for return of a pass/fail indication from L2 cache 130. L1 STQ 127 also issues the STCX request to L2 STQ 166 of L2 cache 130 via store bus 164 with an indication that the STCX is a committed STCX request that is committed to updating the shared memory system (block 544). Thereafter, the STCX request is deallocated from L1 STQ 127, and the process of FIG. 5 terminates at block 550.

Figure 6:
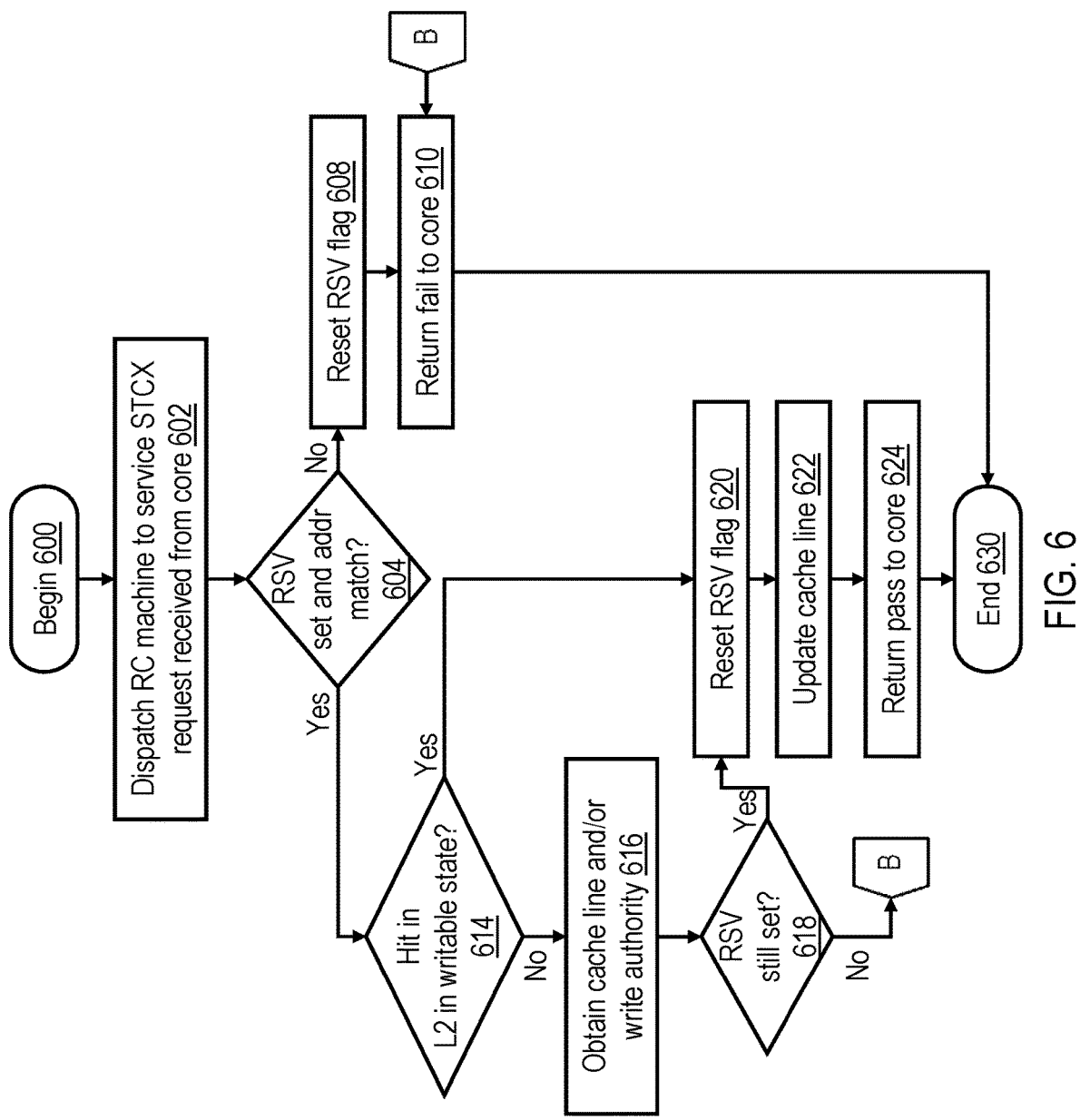
FIG. 6 is a high-level logical flowchart of an exemplary method of processing a store-conditional request in lower level cache in accordance with one embodiment.

Referring now to FIG. 6, there is depicted a high-level logical flowchart of an exemplary method of processing an uncommitted store-conditional (STCX) request in a lower level cache in accordance with one embodiment. (The processing of committed STCX requests that are completed early in processor core 120 is discussed above with reference to block 436 and following blocks of FIG. 4.) As described above, all STCX requests are received by L2 cache 130 within L2 STQ 166 via store bus 164. In some embodiments, L2 STQ 166 may be implemented, like L1 STQ 127, as a FIFO queue. In such embodiments, the process begins at block 600 in response to receipt of an uncommitted STCX request in the bottom entry of L2 STQ 166. The uncommitted STCX request at the bottom entry of L2 STQ 166 will then be selected for dispatch to an idle RC machine 142 for processing, as shown at block 602.

In response to receipt of an uncommitted STCX request for servicing, the dispatched RC machine 142 transitions from an idle state to the busy state. The process of FIG. 6 proceeds from block 602 to block 604, which illustrates the RC machine 142 determining whether or not the processor core 120 has established a valid reservation for the store target address of the uncommitted STCX request by determining whether the RSV flag 150 is set and the associated RSV register 148 specifies a reservation address matching the store target address. If not, RC machine 342 resets the RSV flag 150 (block 608) and returns a fail indication to the processor core 120 via pass/fail bus 174 to report that the uncommitted STCX request made no update to L2 cache 130 (block 610). Thereafter, the RC machine 142 allocated to service the uncommitted STCX request returns to the idle state, and the process of FIG. 6 ends at block 630.

Returning to block 604, in response to RC machine 142 determining that the processor core 120 has a valid reservation for the store target address of the uncommitted STCX request, the process proceeds to block 614, which illustrates the RC machine 142 determining whether or not the store target address of the uncommitted STCX request hits in L2 storage array and directory 140 in a "writeable" coherence state that confers authority on L2 cache 130 to modify the target cache line. If so, the process passes directly to block 620, which is described below. If not, RC machine 142 obtains authority to modify the target cache line and, if necessary, a copy of the target cache line from another cache hierarchy or memory controller 106 by issuing one or more requests on system interconnect 104 (block 616). Once RC machine 142 has obtained a copy of the target cache line in a writeable coherence state, L2 cache 130 determines whether or not the reservation for the target cache line is still set or has been reset, for example, by a snooping process as described below with reference to FIG. 12 (block 618). In response to a determination at block 618 that the reservation for the target cache line is not set, the process passes through page connector B to block 610, which has been described. If, however, RC machine 142 determines at block 618 that the reservation for the target cache line is still set, the process passes to block 620.

At block 620, RC machine 142 resets reservation flag 150. In addition, RC machine 142 updates the target cache line in L2 storage array and directory 140 with the store data of the uncommitted STCX request (block 622). RC machine 142 additionally returns a pass indication to processor core 120 via pass/fail bus 174 to report successful update of the L2 cache 130 (block 624). Thereafter, RC machine 142 returns to the idle state, and the process of FIG. 6 ends at block 630.

Figures 7, 8:
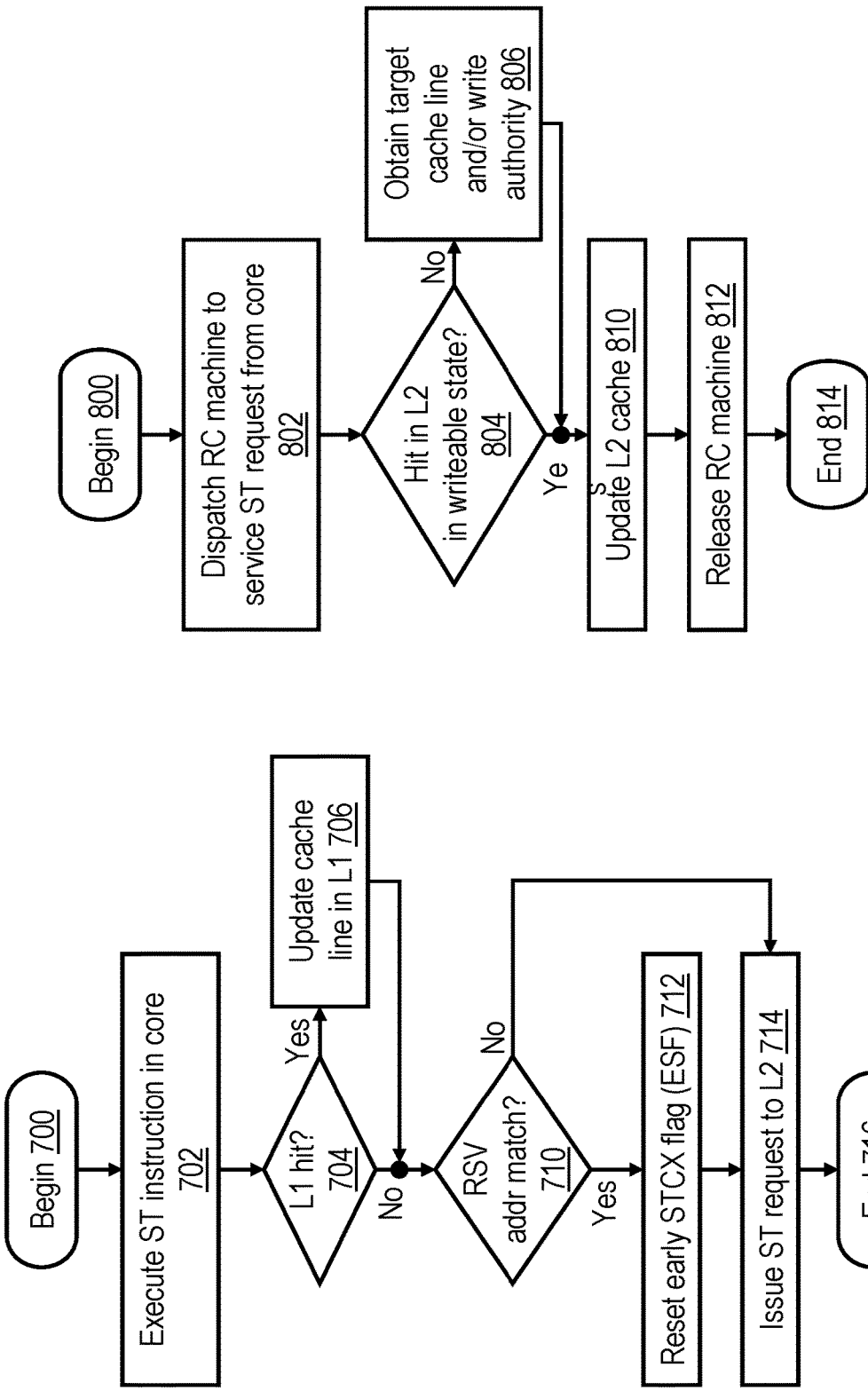
FIG. 7 is a high-level logical flowchart of an exemplary method of processing a store instruction in a processor core in accordance with one embodiment.
FIG. 8 is a high-level logical flowchart of an exemplary method of processing a store request in a lower level cache in accordance with one embodiment.

With reference now to FIG. 7, there is illustrated a high-level logical flowchart of an exemplary method of processing a store instruction in a processor core in accordance with one embodiment. The process of FIG. 7 begins at block 700 and thereafter proceeds to block 702, which illustrates execution units 124 receiving from ISU 122 a store instruction specifying an unconditional update to the shared system memory and then executing the store instruction to calculate a store target address.

Upon execution of the store instruction, execution units 124 place a corresponding store request including the store target address calculated by execution of the store instruction and the store data specified by the operands of the store instruction within L1 STQ 127. When the store request reaches the bottom or commit entry of L1 STQ 127, L1 STQ 127 determines at block 704 whether or not the store target address of the store request hits in L1 cache 126. If so, L1 STQ 127 updates the target cache line held in L1 cache 126 with the store data of the store request (block 706). Additionally, as indicated at blocks 710-712, STCX commitment logic 114 determines whether or not the store target address of the store request matches the reservation address in reservation address register 116, and if so, resets early STCX flag 118. L1 STQ 127 then issues the store request to L2 STQ 166 of L2 cache 130 via store bus 164 (block 714). Thereafter, the process of FIG. 7 ends at block 716.

Referring now to FIG. 8, there is depicted a high-level logical flowchart of an exemplary method of processing a store request in a lower level cache in accordance with one embodiment. As described above, store requests are received by L2 cache 130 within L2 STQ 166 via store bus 164. The process of FIG. 8 begins at block 800 in response to receipt of a store request in the bottom entry of L2 STQ 166. The store request at the bottom entry of L2 STQ 166 will then be selected for dispatch to an idle RC machine 142 for processing, when one becomes available (block 802).

In response to receipt of the store request for servicing, the dispatched RC machine 142 transitions from an idle state to the busy state and determines whether or not the store target address of the store request hits in L2 storage array and directory 140 in a "writeable" coherence state that confers authority on L2 cache 130 to modify the target cache line (block 804). If so, the process passes directly to block 810, which is described below. If not, RC machine 142 obtains authority to modify the target cache line and, if necessary, a copy of the target cache line from another cache hierarchy or memory controller 106 by issuing one or more requests on system interconnect 104 (block 806). The process then proceeds to block 810.

At block 810, RC machine 142 updates the target cache line in L2 storage array and directory 140 with the store data of the store request. Thereafter, the RC machine 142 is released to return to an idle state (block 812), and the process of FIG. 8 ends at block 814.

With reference now to FIG. 9, there is illustrated a high-level logical flowchart of an exemplary method of processing a load instruction in a processor core in accordance with one embodiment. The process of FIG. 9 begins at block 900 and thereafter proceeds to block 902, which illustrates execution units 124 receiving from ISU 122 a load instruction specifying retrieval of data the shared system memory and then executing the load instruction to calculate a load target address.

Upon execution of the load instruction, execution units 124 place a corresponding load request including the load target address calculated by execution of the load instruction within load unit 128. Load unit 128 determines at block 904 whether or not the load target address of the load request hits in L1 cache 126. If so, load unit 128 retrieves the target cache line held in L1 cache 126 (block 906) and populates one of registers 123 with the requested data (block 918). Thereafter, the process of FIG. 9 ends at block 920. If, however, load unit 128 determines at block 904 that the load target address missed in L2 cache 126, the process passes to blocks 910-912. As indicated at blocks 910-912, STCX commitment logic 114 determines whether or not the load target address of the load request matches the reservation address in reservation address register 116, and if so, resets early STCX flag 118. Load unit 128 then issues the load request to L2 LDQ 161 of L2 cache 130 via load bus 160 and awaits return of the requested data (block 914). In response to return of the requested data, LD unit 128 populates L1 cache 126 and one of registers 123 with the requested data (blocks 916-918). The process of FIG. 9 thereafter ends at block 920.

Referring now to FIG. 10, there is depicted a high-level logical flowchart of an exemplary method of processing a load request in a lower level cache in accordance with one embodiment. As described above, load requests are received by L2 cache 130 within L2 LDQ 161 via load bus 160. The process of FIG. 10 begins at block 1000 in response to receipt of a load request in the bottom entry of L2 LDQ 161. The load request at the bottom entry of L2 LDQ 161 will then be selected for dispatch to an idle RC machine 142 for processing (block 1002).

In response to receipt of the load request for servicing, the dispatched RC machine 142 transitions from an idle state to the busy state and determines whether or not the load target address of the load request hits in L2 storage array and directory 140 (block 1004). If so, the process passes directly to block 1008, which is described below. If not, RC machine 142 obtains a copy of the target cache line from another cache hierarchy or memory controller 106 by issuing one or more requests on system interconnect 104 and updates L2 storage array and directory 140 with the target cache line (block 1006). The process then passes to block 1008.

At block 1008, RC machine 142 returns the data requested by the load request to the processor core 120. Thereafter, the RC machine 142 is released to return to an idle state (block 1010), and the process of FIG. 10 ends at block 1012.

Figure 11:
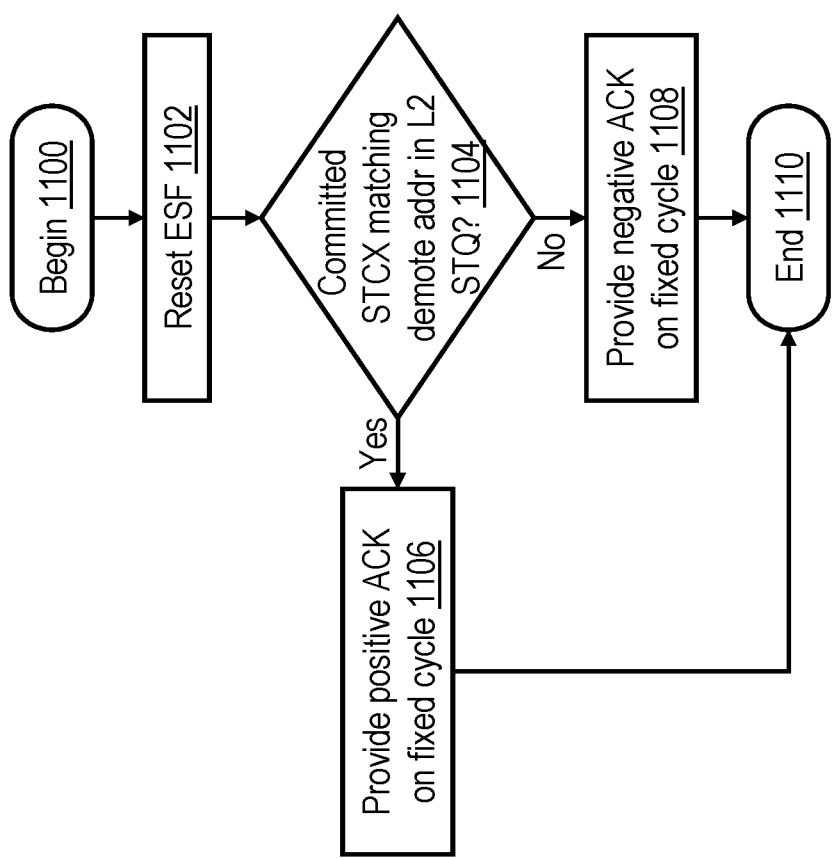
FIG. 11 is a high-level logical flowchart of an exemplary method by which a processor core generates and transmits a demote ACK signal in accordance with one embodiment.

With reference now to FIG. 11, there is illustrated a high-level logical flowchart of an exemplary method by which a processor core 120 generates and transmits a the demote ACK signal in accordance with one embodiment.

The process of FIG. 11 begins at block 1100 in response to receipt by the processor core 120 of a STCX demote signal from the associated L2 cache 130. In response to receipt of STCX demote signal, STCX commitment logic 114 resets ESF 118 to prevent a committed STCX matching the preceding LARX request from subsequently being issued, as discussed above with reference to block 514 of FIG. 5 (block 1102). In addition, as depicted at block 1104, STCX commitment logic 114 determines at block 1104 whether or not a committed STCX request is present in L2 STQ 166. If so, STCX commitment logic 114 issues a positive demote acknowledgement on a fixed cycle (block 1106); otherwise, STCX commitment logic 114 issues a negative demote acknowledgement on a fixed cycle (block 1108). Following either block 1106 or 1108, the process of FIG. 11 ends at block 1110.

Figure 12:
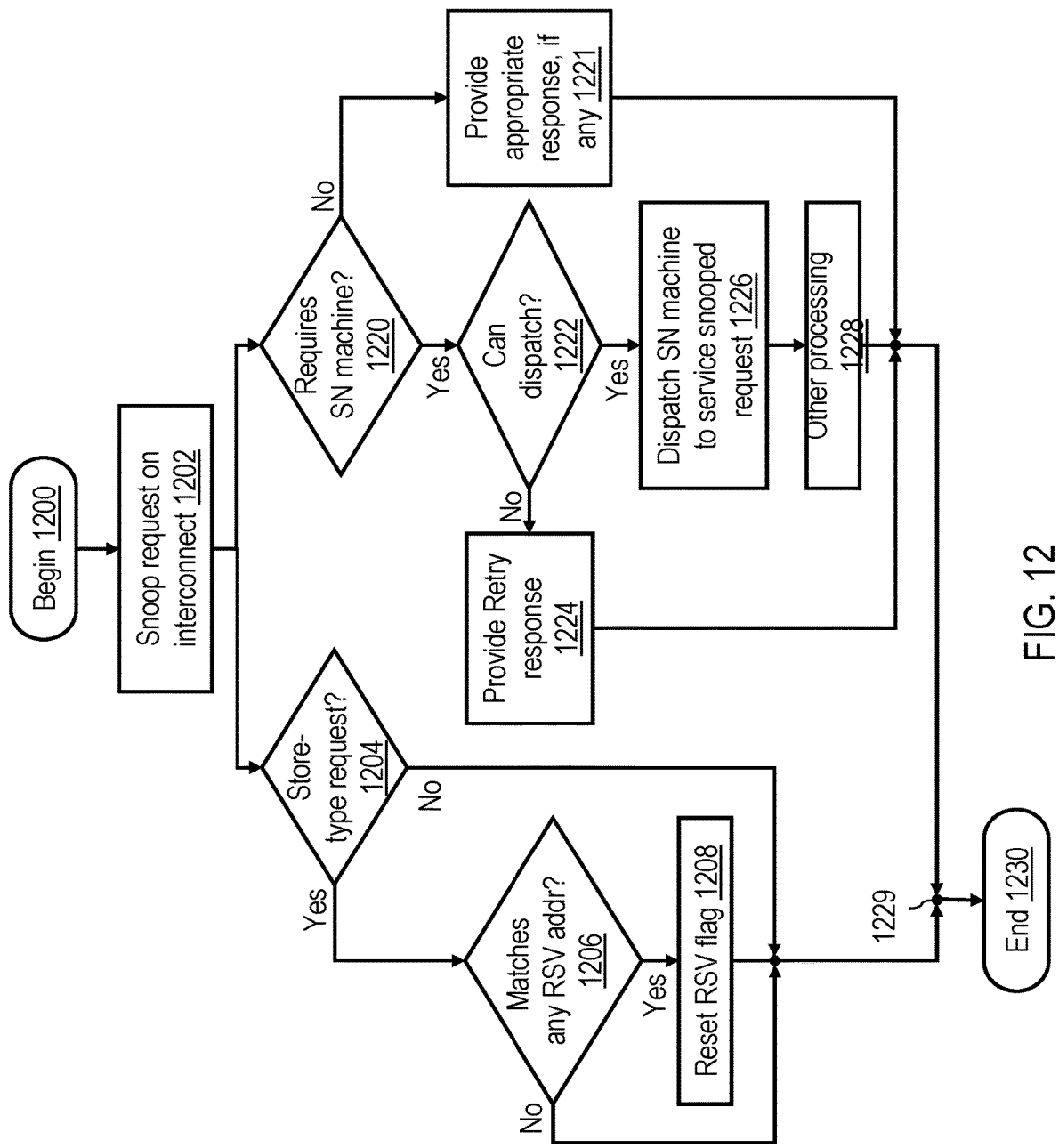
FIG. 12 is a high-level logical flowchart of an exemplary method of processing a snooped request in accordance with one embodiment.

Referring now to FIG. 12, there is illustrated a high-level logical flowchart of an exemplary method by which the L2 cache 130 of a processing unit 102 services a request snooped from a system interconnect in accordance with one embodiment. Those skilled in the art will appreciated that multiple instances of this process can be active in a given L2 cache 230 concurrently. As depicted, the process begins at block 1200 and thereafter proceeds to block 1202, which illustrates an L2 cache 130 snooping a request (e.g., issued by another processing unit 102) on system interconnect 104 via snoop bus 170. Following block 1202, the process of FIG. 12 bifurcates into two concurrent parallel subprocesses—a reservation update subprocess depicted at blocks 1204-1208 in which the effect, if any, of the snooped request on a pending reservation tracked in the L2 cache 130 is managed and a request servicing subprocess at blocks 1220-1228 in which the snooped request is serviced by the snooping L2 cache 130, if necessary. Following completion of both subprocesses, the two subprocesses merge at join point 1229, and process of FIG. 12 ends at block 1230.

Referring first to the reservation update subprocess, the snooping L2 cache 130 determines at block 1204 whether or not the snooped request is a store-type request that modifies or requests authority to modify shared memory. If not, no update to any local reservation is required, and the reservation update subprocess proceeds to join point 1229. If, however, the snooped request is a store-type request that indicates the intention to modify a target cache line, L2 cache 130 resets RSV flag 150 if the store target address of the snooped store-type request matches the reservation address recorded in RSV address register 148 (blocks 1206-1208). Following either block 1206 or block 1208, the reservation update subprocess proceeds to join point 1229.

Referring now to the request servicing subprocess, L2 cache 130 determines at block 1220 whether or not servicing the snooped request requires allocation of a SN machine 144. If not, no SN machine 144 is dispatched to service the snooped request. The L2 cache 130 will nevertheless provide the appropriate coherence response, if any (block 1221), and the request servicing subprocess proceeds to join point 1229. If, however, L2 cache 130 determines at block 1220 that a SN machine 144 is required to service the snooped request, L2 cache 130 further determines at block 1222 whether or not a SN machine 144 can presently be dispatched. In order to dispatch a SN machine 144, a SN machine 144 must be available (i.e., in the idle state) and no RC machine 146 or SN machine 144 can be busy servicing a conflicting request having a target cache line address matching that specified by the snooped request (among other dispatch constraints).

In response to a determination at block 1222 that a SN machine 144 cannot presently be dispatched to service the snooped request, L2 cache 130 provides a Retry coherence response on system interconnect 104 to indicate its present inability to service the snooped request (block 1224). (In response to this Retry coherence response, the source of the snooped request may later represent the request on system interconnect 104.) Following block 1224, the request servicing subprocess proceeds to join point 1229. If, however, L2 cache 130 determines at block 1222 that a SN machine 144 can presently be dispatched to service the snooped request, L2 cache 130 dispatches an idle SN machine 144 to service the snooped request (block 1226). The dispatched snoop machine 144 transitions from the idle state to the busy state and then performs at block 1228 whatever additional processing is required to service the snooped request (e.g., updating L2 storage array and directory 140 and/or L1 cache 110, sourcing a copy of the target cache line, providing protocol-dependent coherence responses, etc.). Following completion of its processing at block 1228, the SN machine 144 dispatched to service the snooped request transitions from the busy state to the idle state, and the request servicing subprocess proceeds to join point 1229.

Figure 13:
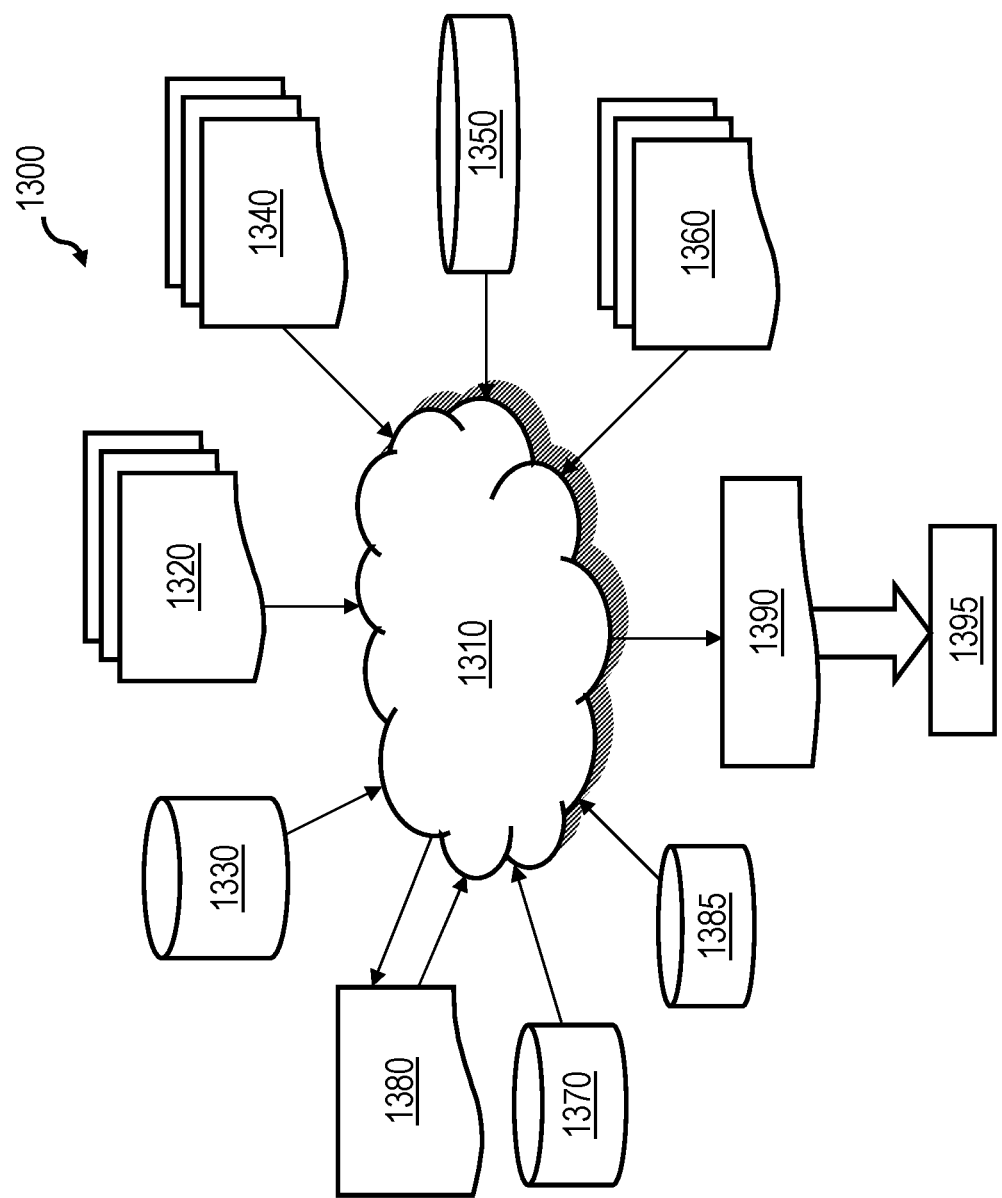
FIG. 13 is a block diagram of an exemplary design flow.

With reference now to FIG. 13, there is illustrated a block diagram of an exemplary design flow 1300 used for example, in semiconductor IC logic design, simulation, test, layout, and manufacture. Design flow 1300 includes processes, machines and/or mechanisms for processing design structures or devices to generate logically or otherwise functionally equivalent representations of the design structures and/or devices described above and shown herein. The design structures processed and/or generated by design flow 1300 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1300 may vary depending on the type of representation being designed. For example, a design flow 1300 for building an application specific IC (ASIC) may differ from a design flow 1300 for designing a standard component or from a design flow 1300 for instantiating the design into a programmable array, for example a programmable gate array (PGA) or a field programmable gate array (FPGA) offered by Altera® Inc. or Xilinx® Inc.

FIG. 13 illustrates multiple such design structures including an input design structure 1320 that is preferably processed by a design process 1310. Design structure 1320 may be a logical simulation design structure generated and processed by design process 1310 to produce a logically equivalent functional representation of a hardware device. Design structure 1320 may also or alternatively comprise data and/or program instructions that when processed by design process 1310, generate a functional representation of the physical structure of a hardware device. Whether representing functional and/or structural design features, design structure 1320 may be generated using electronic computer-aided design (ECAD) such as implemented by a core developer/designer. When encoded on a machine-readable data transmission, gate array, or storage medium, design structure 1320 may be accessed and processed by one or more hardware and/or software modules within design process 1310 to simulate or otherwise functionally represent an electronic component, circuit, electronic or logic module, apparatus, device, or system such as those shown herein. As such, design structure 1320 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1310 preferably employs and incorporates hardware and/or software modules for synthesizing, translating, or otherwise processing a design/simulation functional equivalent of the components, circuits, devices, or logic structures shown herein to generate a netlist 1380 which may contain design structures such as design structure 1320. Netlist 1380 may comprise, for example, compiled or otherwise processed data structures representing a list of wires, discrete components, logic gates, control circuits, I/O devices, models, etc. that describes the connections to other elements and circuits in an integrated circuit design. Netlist 1380 may be synthesized using an iterative process in which netlist 1380 is resynthesized one or more times depending on design specifications and parameters for the device. As with other design structure types described herein, netlist 1380 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1310 may include hardware and software modules for processing a variety of input data structure types including netlist 1380. Such data structure types may reside, for example, within library elements 1330 and include a set of commonly used elements, circuits, and devices, including models, layouts, and symbolic representations, for a given manufacturing technology (e.g., different technology nodes, 32 nm, 45 nm, 130 nm, etc.). The data structure types may further include design specifications 1340, characterization data 1350, verification data 1360, design rules 1390, and test data files 1385 which may include input test patterns, output test results, and other testing information. Design process 1310 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1310 without deviating from the scope and spirit of the invention. Design process 1310 may also include modules for performing standard circuit design processes such as timing analysis, verification, design rule checking, place and route operations, etc.

Design process 1310 employs and incorporates logic and physical design tools such as HDL compilers and simulation model build tools to process design structure 1320 together with some or all of the depicted supporting data structures along with any additional mechanical design or data (if applicable), to generate a second design structure 1390. Design structure 1390 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1320, design structure 1390 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 1390 may comprise a compiled, executable HDL simulation model that functionally simulates the devices shown herein.

Design structure 1390 may also employ a data format used for the exchange of layout data of integrated circuits and/or symbolic data format (e.g., information stored in a GDSII (GDS2), GL1, OASIS, map files, or any other suitable format for storing such design data structures). Design structure 1390 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 1390 may then proceed to a stage 1395 where, for example, design structure 1390: proceeds to tape-out, is released to manufacturing, is released to a mask house, is sent to another design house, is sent back to the customer, etc.

As has been described, in at least one embodiment, a data processing system includes multiple processing units all having access to a shared memory system. A processing unit includes a lower level cache configured to serve as a point of systemwide coherency and a processor core coupled to the lower level cache. The processor core includes an upper level cache, an execution unit that executes a store-conditional instruction to generate a store-conditional request that specifies a store target address and store data, and a flag that, when set, indicates the store-conditional request can be completed early in the processor core. The processor core also includes completion logic configured to commit an update of the shared memory system with the store data specified by the store-conditional request based on whether the flag is set.

While various embodiments have been particularly shown and described, it will be understood by those skilled in the art that various changes in form and detail may be made therein without departing from the spirit and scope of the appended claims and these alternate implementations all fall within the scope of the appended claims.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although a particular embodiment of a memory hierarchy has been described in which L1 and L2 caches are incorporated within a processing unit, those skilled in the art will appreciate that a greater or lesser number of levels of cache hierarchy may be employed. Further, these levels of cache hierarchy may include in-line or lookaside caches and may include one or more levels of off-chip cache. Further, the level of cache hierarchy at which coherency is determined may differ from that discussed with reference to the described embodiments.

Further, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like. However, as employed herein, a "storage device" is specifically defined to include only statutory articles of manufacture and to exclude signal media per se, transitory propagating signals per se, and energy per se.

The program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A processing unit for a data processing system, the data processing system including multiple processing units all having access to a shared memory system, said processing unit comprising:
    a lower level cache configured to serve as a point of systemwide coherency;
    a processor core coupled to the lower level cache, the processor core including:
        an upper level cache;
        an execution unit that executes a store-conditional instruction, wherein execution of the store-conditional instruction generates a store-conditional request that specifies a store target address and store data;
a flag that, when set, indicates the store-conditional request can be completed early in the processor core; and
completion logic configured to commit an update of the shared memory system with the store data in the processor core based on whether the flag is set.

2. The processing unit of claim 1, wherein the processor core is configured to set the flag to indicate the store-conditional request can be committed to the shared memory system based on an indication received from the lower level cache in conjunction with data from a target cache line identified by the store target address.

3. The processing unit of claim 2, wherein the lower level cache is configured to provide the indication to the processor core based on the lower level cache receiving a load-reserve request for the target cache line and the target cache line being associated with a writeable coherence state in the lower level cache.

4. The processing unit of claim 1, wherein:
the processor core is configured to transmit the store-conditional request to the lower level cache with an indication that the store-conditional request is a completed store-conditional request;
the lower level cache includes a cache array; and
the lower level cache includes a state machine that services a load-reserve request for a target cache line associated with the store target address, and following servicing of the load-reserve request, remains in a busy state to service the completed store-conditional request by causing the target cache line to be updated with the store data in the cache array.

5. The processing unit of claim 1, wherein the lower level cache is configured, based on failing to receive the completed store-conditional request within a timeout period, to transmit to the processor core a signal to reset the flag.

6. The processing unit of claim 1, wherein:
the completion logic is configured, based on the flag not being set, to refrain from committing an update to the shared memory system in the processor core;
the processor core is configured, based on the flag not being set, to transmit an uncompleted store-conditional request to the lower level cache; and
the lower level cache includes reservation logic including a reservation flag, wherein the reservation logic is configured to determine whether to update the shared memory system in response to the uncompleted store-conditional request based on a state of the reservation flag.

7. A data processing system, comprising:
the multiple processing units, including the processing unit of claim 1;
a system memory; and
a system interconnect communicatively coupling the system memory and the multiple processing units.

8. A design structure tangibly embodied in a machine-readable storage device for designing, manufacturing, or testing an integrated circuit, the design structure comprising:
a processing unit for a data processing system, the data processing system including multiple processing units all having access to a shared memory system, said processing unit including:
a lower level cache configured to serve as a point of systemwide coherency;
a processor core coupled to the lower level cache, the processor core including:
an upper level cache;
an execution unit that executes a store-conditional instruction, wherein execution of the store-conditional instruction generates a store-conditional request that specifies a store target address and store data;
a flag that, when set, indicates the store-conditional request can be completed early in the processor core; and
completion logic configured to commit an update of the shared memory system with the store data in the processor core based on whether the flag is set.

9. The design structure of claim 8, wherein the processor core is configured to set the flag to indicate the store-conditional request can be committed to the shared memory system based on an indication received from the lower level cache in conjunction with data from a target cache line identified by the store target address.

10. The design structure of claim 9, wherein the lower level cache is configured to provide the indication to the processor core based on the lower level cache receiving a load-reserve request for the target cache line and the target cache line being associated with a writeable coherence state in the lower level cache.

11. The design structure of claim 8, wherein:
the processor core is configured to transmit the store-conditional request to the lower level cache with an indication that the store-conditional request is a completed store-conditional request;
the lower level cache includes a cache array; and
the lower level cache includes a state machine that services a load-reserve request for a target cache line associated with the store target address, and following servicing of the load-reserve request, remains in a busy state to service the completed store-conditional request by causing the target cache line to be updated with the store data in the cache array.

12. The design structure of claim 8, wherein the lower level cache is configured, based on failing to receive the completed store-conditional request within a timeout period, to transmit to the processor core a signal to reset the flag.

13. The design structure of claim 8, wherein:
the completion logic is configured, based on the flag not being set, to refrain from committing an update to the shared memory system in the processor core;
the processor core is configured, based on the flag not being set, to transmit an uncompleted store-conditional request to the lower level cache; and
the lower level cache includes reservation logic including a reservation flag, wherein the reservation logic is configured to determine whether to update the shared memory system in response to the uncompleted store-conditional request based on a state of the reservation flag.

14. A method of data processing in a processing unit of a data processing system, the data processing system including multiple processing units all having access to a shared memory system, said method comprising:
a processor core of the processing unit executing a store-conditional instruction and generating a corresponding store-conditional request that specifies a store target address and store data;
the processor core maintaining a flag that, when set, indicates the store-conditional request can be completed early in the processor core; and the processor core, based on the flag being set, committing an update of the shared memory system with the store data in the processor core.

15. The method of claim 14, wherein the maintaining includes the processor core setting the flag to indicate the store-conditional request can be committed to the shared memory system based on an indication received from the lower level cache in conjunction with data from a target cache line identified by the store target address.

16. The method of claim 15, and further comprising the lower level cache providing the indication to the processor core based on the lower level cache receiving a load-reserve request for the target cache line and the target cache line being associated with a writeable coherence state in the lower level cache.

17. The method of claim 14, wherein the lower level cache includes a cache array, and wherein the method further comprises:
the processor core transmitting the store-conditional request to the lower level cache with an indication that the store-conditional request is a completed store-conditional request;

the lower level cache servicing a load-reserve request for the target cache line associated with the store target address, and following servicing of the load-reserve request, remaining in a busy state to service the completed store-conditional request by causing the target cache line to be updated with the store data in the cache array.

18. The method of claim 14, and further comprising the lower level cache, based on failing to receive the completed store-conditional request within a timeout period, transmitting to the processor core a signal to reset the flag.

19. The method of claim 14, and further comprising:
the processor core, based on the flag not being set, refraining from committing an update to the shared memory system in the processor core and transmitting an uncompleted store-conditional request to the lower level cache; and
the lower level cache, based on receipt of the uncompleted store-conditional request, determining whether to update the shared memory system in response to the uncompleted store-conditional request based on a state of a reservation flag in the lower level cache.

* * * * *